United States Patent

Rechdan et al.

Patent Number: 5,982,155
Date of Patent: Nov. 9, 1999

[54] METHOD FOR REGULATING THE EXCITATION CURRENT IN A MOTOR VEHICLE ALTERNATOR BY DIGITAL PROCESSING, AND A REGULATING DEVICE FOR CARRYING OUT THE METHOD

[75] Inventors: Raymond Rechdan, Paris; Bryan Planchard, Fourqueux, both of France

[73] Assignee: Valeo Equipments Electriques Moteur, Creteil, France

[21] Appl. No.: 08/834,243

[22] Filed: Apr. 15, 1997

[30] Foreign Application Priority Data

Apr. 18, 1996 [FR] France ................................ 96 04855

[51] Int. Cl.⁶ .................................................... H02J 7/24
[52] U.S. Cl. ................................ 322/36; 322/28; 322/25; 318/439
[58] Field of Search ................................ 322/20, 25, 27, 322/28, 29, 33, 34, 36; 290/46, 49; 318/439

[56] References Cited

U.S. PATENT DOCUMENTS

| | | | |
|---|---|---|---|
| 4,602,205 | 7/1986 | Matsuhashi et al. | 320/64 |
| 4,673,862 | 6/1987 | Wahlstrom | 320/64 |
| 5,079,496 | 1/1992 | Pierret et al. | 322/28 |
| 5,157,321 | 10/1992 | Kato et al. | 322/28 |
| 5,296,798 | 3/1994 | Pierret et al. | 322/28 |
| 5,521,485 | 5/1996 | Vogelsberger | 322/28 |
| 5,548,202 | 8/1996 | Schramm et al. | 322/33 |

FOREIGN PATENT DOCUMENTS 0 481 862  4/1992  European Pat. Off. .

OTHER PUBLICATIONS

Elektronik, vol. 34, No. 24, Nov. 1985, Munchen, Germany
French Search Report dated Jan. 10, 1997.

*Primary Examiner*—Nestor Ramirez
*Assistant Examiner*—Nicholas Ponomarenko
*Attorney, Agent, or Firm*—Morgan & Finnegan, L.L.P.

[57] ABSTRACT

The method of regulation includes:
  starting to measure the rectified voltage at the output of the alternator during each period T of this voltage,
  performing this measurement by sampling over a predetermined period $T_e$,
  comparing this measured value of the rectified voltage with a calculated reference value, and
  deducing from this comparison the duration of the first phase $T_1$ for the next following period T, this first phase being the one in which the battery voltage of the vehicle is applied to the alternator rotor winding. The sampling measurement of period $T_e$ ends, in each period T, at an instant T–ϵ, where ϵ is a period of time which is very short by comparison with the length of the period T.

11 Claims, 5 Drawing Sheets

METHOD FOR REGULATING THE EXCITATION CURRENT IN A MOTOR VEHICLE ALTERNATOR BY DIGITAL PROCESSING, AND A REGULATING DEVICE FOR CARRYING OUT THE METHOD

FIELD OF THE INVENTION

The present invention relates to a method for regulating the excitation current of a motor vehicle alternator by digital processing, and a regulating device for carrying out such a method.

BACKGROUND OF THE INVENTION

As is well known, an alternator is an electrical machine in which an alternating current is generated in its stator windings under the effect of inductor or rotor winding, through which an excitation current flows when the rotor winding is put into rotation. At the output of the stator windings, a diode bridge rectifies the alternating current so as to deliver a uni-directional, or direct current, voltage to the battery of the vehicle.

The rectified voltage has to be regulated in such a way as to remain constant regardless of the speed of rotation of the alternator, and regardless of the load on the battery. The output voltage of the alternator thus has a regulation waveform which reflects the excitation current, this waveform having a period T. The period T comprises a first phase $T_1$ and a second phase $T_2$ alternating with each other, i.e. having opposite signs whereby the amplitude increases in one phase and decreases in the other. In the first phase, the battery voltage is applied to the rotor winding, which enables the current flowing in the rotor winding to increase; while in the second phase, the battery voltage is not applied to the rotor winding, and this reduces the current in the rotor winding. The ratio $T_1/(T_1+T_2)$ is called the cyclic ratio.

It has previously been proposed to carry out the regulation of the rectified voltage output from the alternator using digital techniques. For example, European patent specification No. EP 0 481 862 describes a procedure for regulation by digital processing, in which the output voltage of the alternator is measured at each period T by sampling. This sampling comprises the step of detecting, in each period T, whichever is the longer one of the phases $T_1$ or $T_2$. The sampling step is performed over a time period $T_e$ which occurs in the middle of the longer one of the two phases. The numerical value of the measured voltage is then compared with a reference value of the voltage, and from this comparison the value of the phases $T_1$ and $T_2$ in the next following period is deduced.

That method of regulation, although satisfactory because it enables variations due to the waveform to be minimised, by centring the measurement of the voltage to be regulated on the longer of the two phases, is relatively complicated to perform in practice. In this connection, it is necessary, firstly to find out which one of the two phases is longer than the other, and secondly to centre the sampling period in the middle of that phase. It has also been found that regulation errors tend to appear when a cyclic ratio diminishes from a value greater than 50% (where the first phase $T_1$ is the longer one) to a value less than 50%, in which it is the second phase $T_2$ that is the longer one.

DISCUSSION OF THE INVENTION

The object of the present invention is to resolve the above mentioned problems.

According to the invention, a method of regulating the excitation current of a rotor winding of an alternator for a motor vehicle, the said alternator including, in particular, a rectifier bridge for delivering a rectified voltage to be regulated by the said method, the rectified voltage having a waveform comprising a low frequency component produced by a variable amplitude excitation signal, the said rectified voltage being therefore a periodic voltage, each period T of which is divided into a first phase $T_1$ of one sign, during which the voltage from the battery of the vehicle is applied to the rotor winding, and a second phase $T_2$ of the opposite sign, during which the voltage of the battery is not applied to the rotor winding, wherein the said method comprises the steps of:

starting to measure the rectified voltage during each said period T, performing the said measurement over a predetermined period $T_e$ by sampling, that is to say by carrying out successive measurements close together, comparing the measured value of the rectified voltage with a calculated reference value, and deducing from that comparison the duration of the first phase $T_1$ of the next following period T, is characterised in that the measurement by sampling over a sampling period $T_e$ stops, in each period T, at an instant T−ϵ, ϵ being a time period which is very short by comparison with the duration of the period T.

According to a preferred feature of the invention, the duration of the sampling period $T_e$ is substantially equal to one half of the duration of the period T.

Thus, by carrying out a measurement over one half of a period, and by always doing this measurement at the end of the period, the measured value represents the output voltage of the alternator, and the measuring procedure is simplified as compared with those in the prior art.

Preferably, the comparison of the measured value of the rectified voltage with the said calculated reference value is performed over the time period ϵ defined between the end of the sampling measurement of duration $T_e$ and the end of the period T.

The calculation of the duration of the said first phase $T_1$ in the next following period T is preferably carried out during the time period ϵ defined between the end of the sampling measurement of duration $T_e$ and the end of the period T.

According to a preferred feature of the invention, the time period ϵ is substantially equal to the minimum time necessary for carrying out the steps of:

carrying out the comparison between the measured value of the rectified voltage and the calculated reference value, and calculating the duration of the said first phase $T_1$ of the next following period T.

The reference value is preferably calculated as a function of at least one parameter associated with the alternator and/or with the battery of the vehicle; and preferably, the reference value is calculated as a function of the temperature of the alternator and/or of the battery of the vehicle.

Preferably, the calculation of the reference value is carried out over a time period from the start of the period T to the start of the sampling measurement of duration $T_e$.

According to another preferred feature of the invention, the method of regulation includes the steps of:

during each period T, performing a measurement of temperature, and deducing therefrom a reference value as a function of the measured temperature, the said reference value being then compared with the measured value of the rectified voltage.

According to a further preferred feature of the invention, the reference value is calculated from a predetermined value for a given temperature, by applying to the said predetermined value a correcting factor which is a function of the temperature.

The invention is also applicable to a device for regulating the excitation current in an alternator, which is adapted for carrying out the method of the invention.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
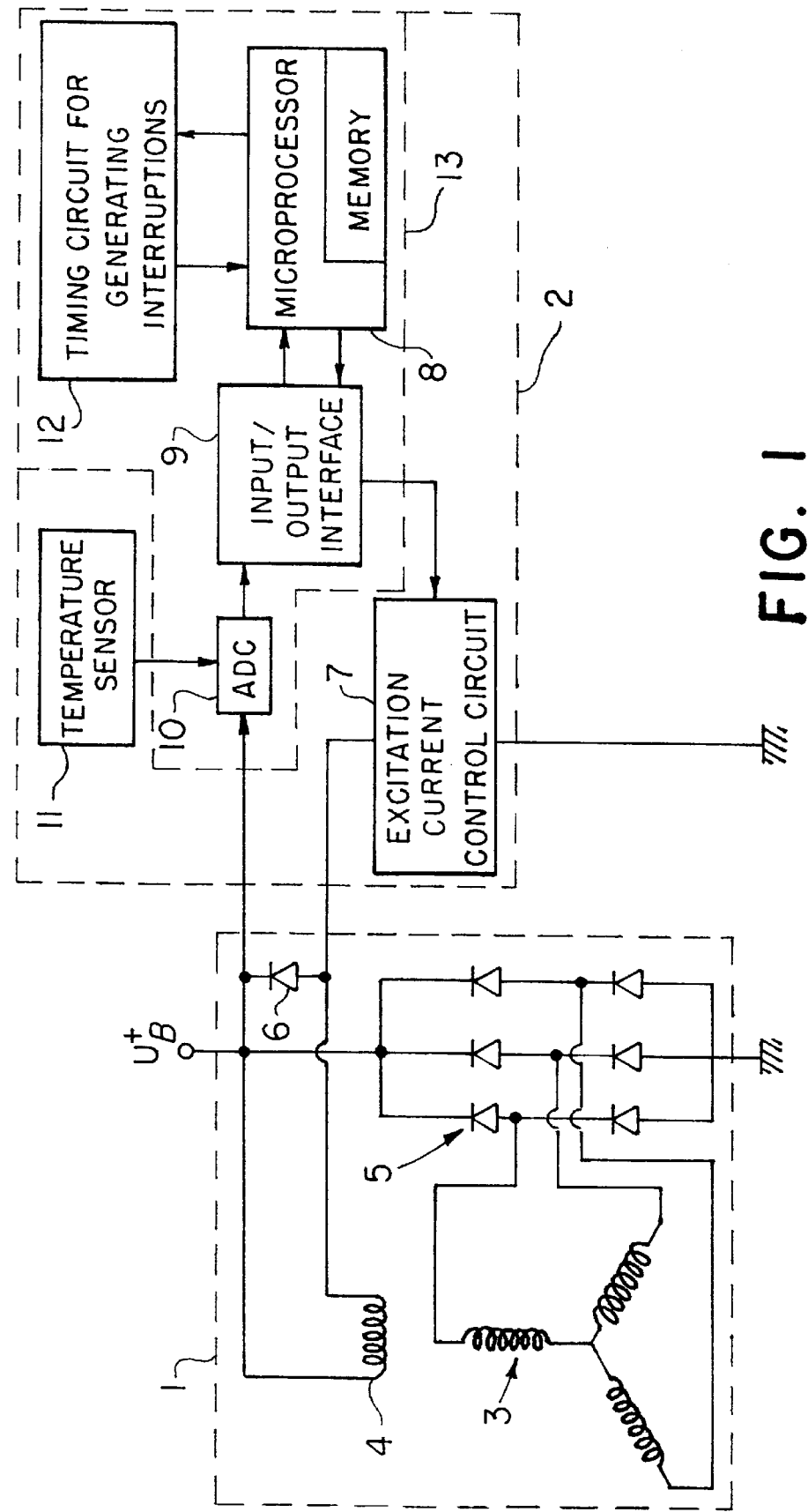
FIG. 1 is a block diagram of a regulating device in accordance with the invention.

Reference is first made to FIG. 1, which shows an alternator 1 having stator windings 3, in which an alternating voltage is generated by a rotor winding 4 or inductor. A diode bridge 5 is connected to the output of the stator windings 3 so as to deliver a rectified voltage $U_B^+$, which is applied to the battery and to the onboard wiring network of the vehicle.

The excitation current flowing through the rotor winding 4 is regulated by a regulating device 2, which includes an excitation current control circuit 7. The control circuit 7 consists for example of a power transistor which passes an excitation current when in the passing state. When the power transistor is blocked, it prevents the rotor winding 4 from being supplied with any voltage by the battery of the vehicle. A diode 6, connected in parallel with the rotor winding 4, ensures the circulation of the current in the rotor winding during those phases in which the rotor winding is no longer energised by the battery.

The regulating device 2 also includes a microcontroller 13 which comprises circuits 8, 9, 10 and 12. The circuit 8 is a microprocessor having a memory. The microprocessor 8 performs the various calculations and processing steps necessary for the voltage regulation. The circuit 9 is an input and output interface for the microprocessor. The circuit 10 is an analogue/digital converter, which converts the alternator output voltage $U_B^+$ into a set of octets, and which also converts the voltage, received from a temperature sensor 11 and representing the temperature of the alternator 1 or of the battery, into a digital value.

Finally, the circuit 12 is a timing circuit, which causes interruptions to occur in order to change the state of excitation of the rotor winding 4. The timing circuit 12 contains data calculated by the microprocessor 8. The temperature sensor 11 is part of the regulating device 2.

Figure 2:
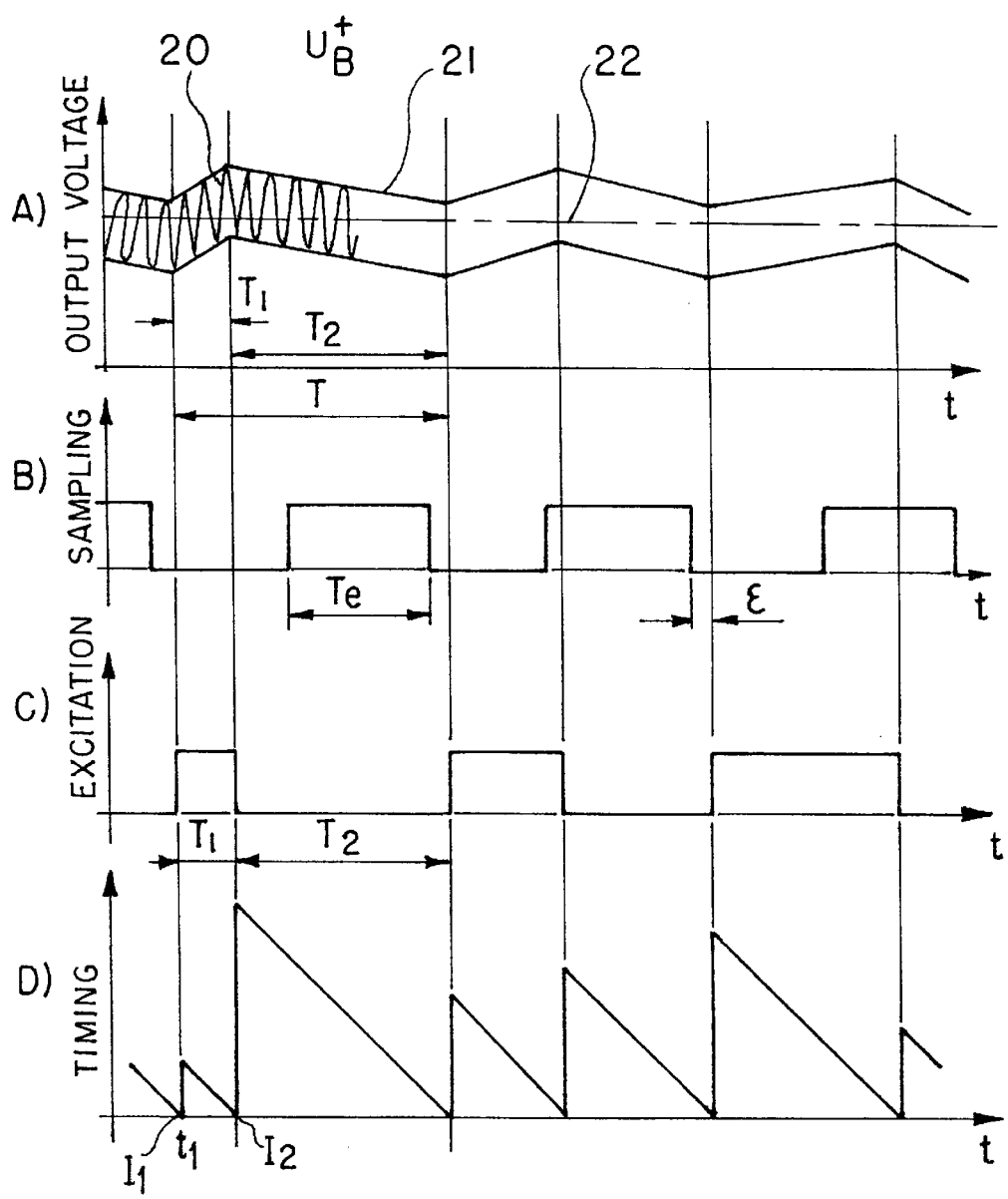
FIG. 2 consists of a set of time diagrams for various electrical signals which illustrate the method of the invention.

Reference is now made to FIG. 2A, in which the voltage $U_B^+$ to be regulated is shown as it appears at the output of the alternator or on the wiring network of the vehicle, with time being indicated on the abscissa and the voltage on the ordinate. The voltage $U_B^+$ has a high-frequency waveform 20, which is due in particular to the diode bridge 5 rectifying the voltage $U_B^+$. A wave 21, having a much lower frequency, is superimposed on the wave 20. The wave 21 varies in amplitude as a function of the variations in the excitation current in the rotor winding 4. Thus, the mean value of the voltage $U_B^+$ oscillates about a mean voltage 22.

In conjunction with FIG. 2C, which shows the excitation voltage applied to the rotor winding 4 as a function of time, the low-frequency wave 21 has a period T which consists of two alternating phases $T_1$ and $T_2$. During the phase $T_1$, a square pulse appears in FIG. 2C, signifying that an excitation voltage is applied to the rotor winding 4, which causes the voltage $U_B^+$ to increase as can be seen in FIG. 2A. On the other hand, during the phase $T_2$ no excitation voltage is applied to the rotor winding, so that in FIG. 2C the level is zero, and this causes the voltage $U_B^+$ to decrease as shown in FIG. 2A.

The cyclic ratio $T_1/(T_1+T_2)$ may in theory vary from 0 to 100% according to the demands of the load circuits of the vehicle, and according to the state of charge of the battery.

FIG. 2B shows rectangular pulses $T_e$ which correspond to the time period during which the voltage $U_B^+$ is measured by sampling in the course of each period T. The sampling period $T_e$ is timed to occur in the later part of each period T, regardless of the cyclic ratio, in such a way that the sampling period terminates at an instant which occurs very shortly before the end of the period T. This very short time period from the end of the sampling period $T_e$ to the end of the period T is denoted $\epsilon$.

In a preferred embodiment of the invention, the sampling pulse $P_e$ has a duration which is substantially equal to one half of the period T. For example, if the period T is 16 milliseconds, the duration of the sampling period will be 8 milliseconds, and the time $\epsilon$ will be less than 1 millisecond.

Thus, measurement of the voltage $U_B^+$ is reliable, because it lasts for a half period, and the fact that it occurs at the end of the period T gives a rapid response time for the regulating device 2.

All of these operations are carried out by a programme which is generated by the microcontroller 13. Thus, referring to FIG. 2D, this shows that an interruption $I_1$, produced by the timing circuit 12, initiates an excitation pulse which can be seen in FIG. 2C, and which prevails over the whole of the period $T_1$ that is loaded into the timing circuit 12. Once this period $T_1$ has elapsed, the timing circuit 12 produces another interruption $I_2$, which causes the excitation to switch to zero for the whole of the period $T_2$.

In the remainder of this description, the sequence of operation of the method for regulation of the voltage will be described with reference to the process charts in FIGS. 3 and 4, which show just one example of a way in which the method may be carried out.

Figure 3:
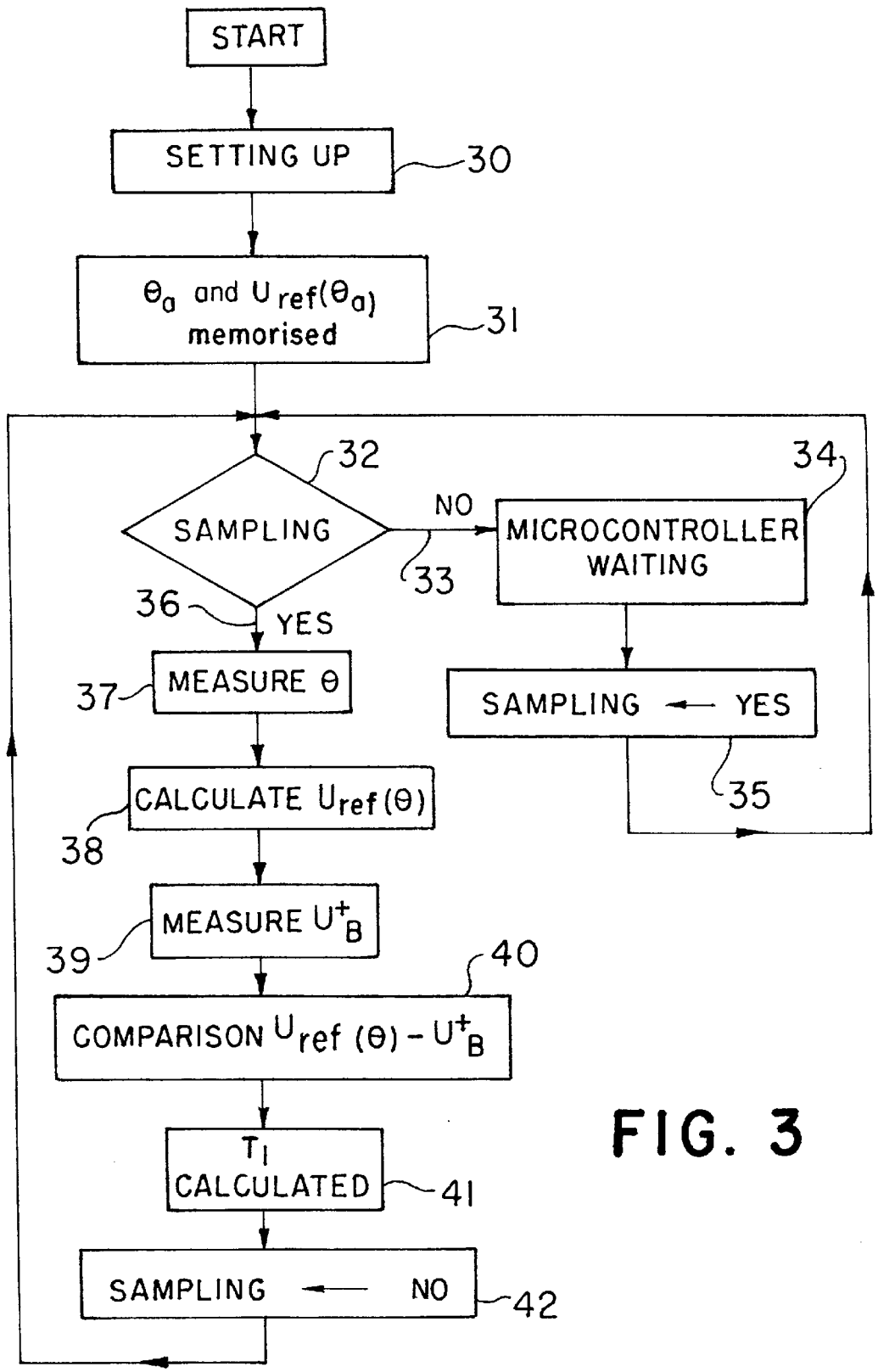
FIG. 3 is a process chart showing steps in the method of the invention.
Figure 4:
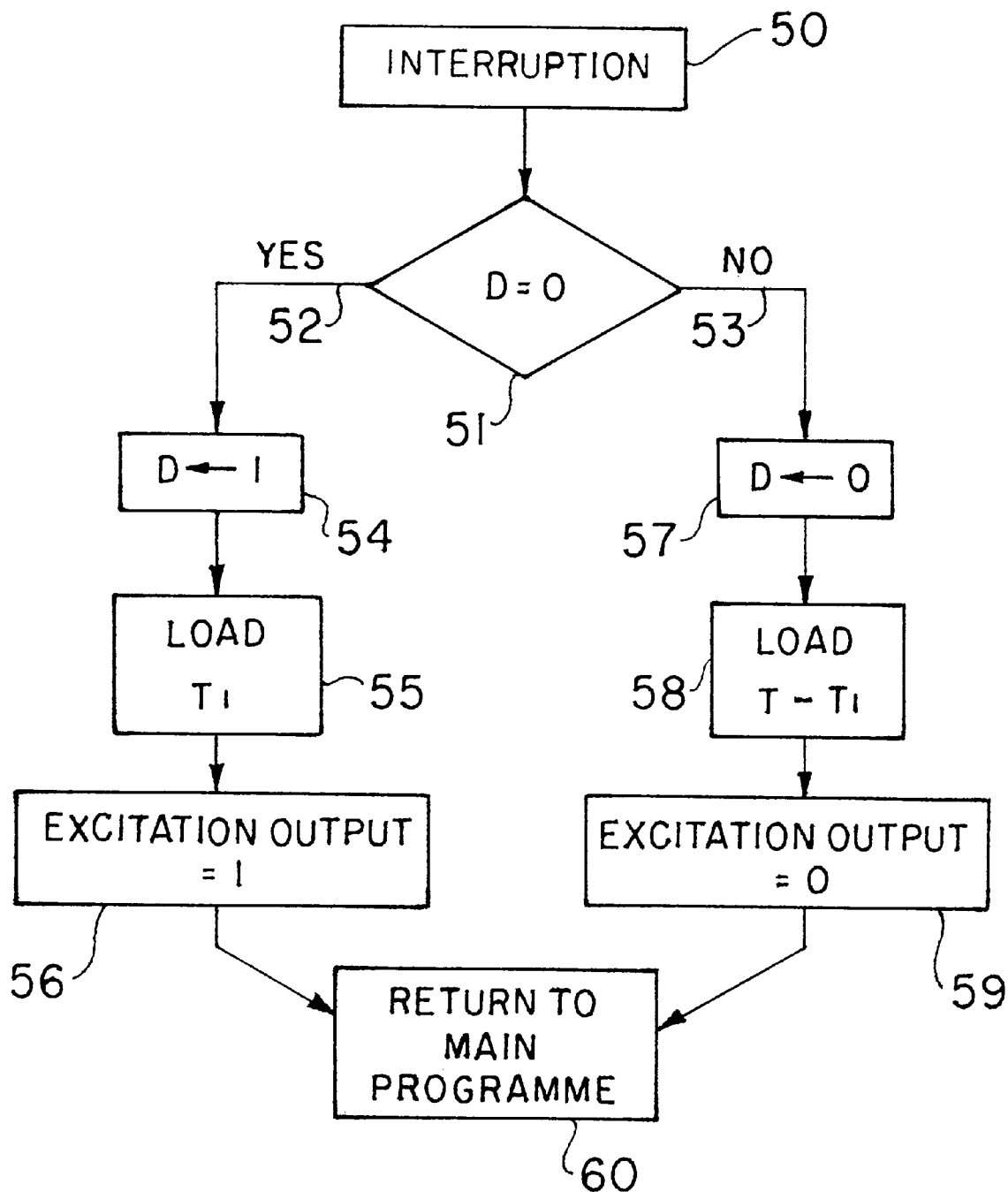
FIG. 4 is another process chart showing steps in the method of the invention.

FIG. 3 shows the main programme which is performed by the microcontroller 13, while FIG. 4 shows an interruption program which is carried out at each interruption generated by the timing circuit 12. The duration of each of these interruptions is negligible with respect to that of the other operations performed by the main program of FIG. 3.

In FIG. 3, the main program starts with a setting-up step 30, in which all of the parameters used by the microcontroller 13 and by the timing circuit 12 are initiated. The setting-up step 30 is followed by a memorising step 31, in which the predetermined values of the temperature $\theta_a$ and the corresponding voltage $U_{ref}(\theta_a)$ are memorised.

For the purposes of describing this program in detail, it is assumed that the instant at which the interruption $I_1$ has just been triggered, initiating an excitation pulse $T_1$, happens at the instant $t_1$.

The sampling indicator has been set at NO during the setting-up step 30 of the program. Then, when the sampling test 32 is performed, it is the output 33 which is selected. The microcontroller then waits, in a step 34, for a time period to elapse, this waiting period having been previously entered into the memory and being less than $T-T/2-\epsilon$. The sampling indicator is then set at YES in a step 35. It should be noted that the waiting period 34 of the microcontroller may be made use of more profitably by carrying out calculations or processing operations which are complementary to each other, and which do not impinge directly on the present invention.

During the new sampling test 32 of the sampling indicator, it is its output 36 which is selected. The following operations are then carried out:

(a) The temperature $\theta$ is measured in a step 37, using information received from the temperature sensor 11 by the analogue/digital converter 10.

(b) The reference value $U_{ref}(\theta)$ is computed in a calculation step 38 as a function of the temperature $\theta$ which has been measured; the method of calculation will be explained later herein with reference to FIG. 5.

(c) Once a time period $T-T/2-\epsilon$ has elapsed since the instant $t_1$, measurement of the voltage $U_B^+$ is started in another measuring step 39. This measurement is continued over the whole period $T_e$ by sampling, that is to say that N successive measurements of $U_B^+$ are carried out very close to each other, and these are added and memorised by the microprocessor 8 in the form of a number consisting of two octets.

(d) At the end of the period $T_e$, and during the very short time period $\epsilon$, a comparison step 40 takes place. In this step, the measured value of the voltage $U_B^+$ is compared with the reference value $U_{ref}(\theta)$ calculated in the step 38. Then, in a step 41, a new value of the phase $T_1$, for the next period T, is deduced from that comparison.

(e) The sampling indicator is switched to NO in a step 42, and the system returns to the sampling test 32.

The time $\epsilon$ thus corresponds to the minimum time which is necessary for the microprocessor 8 to be able to carry out:

the comparison 40 between the measured value of the voltage $U_B^+$ and the reference value $U_{ref}(\theta)$; and the calculation of the value of the phase $T_1$ of the next following cycle of the voltage. The time $\epsilon$ thus depends on the calculating speed of the microprocessor 8.

In a modified version of the method, the operations of measuring the temperature $\theta$ in step 37, and of calculating the reference value $U_{ref}(\theta)$ in step 38, may be performed in step 34.

Referring now to FIG. 4, the interruption program, which is carried out by the microcontroller 13 each time an interruption is produced by the timing circuit 12, will now be described. When such an interruption 50 occurs, a test 51 is carried out to discover the state of an interruption control "flag" D. If the flag D is at zero, the YES output 52 of the test is then selected. In the next step 54, the value 1 is loaded as soon as possible into the flag D. This is followed by a step 55, in which the value $T_1$ which has been calculated by the main program is loaded into the timing circuit 12 so that the latter will produce the next interruption once the time period $T_1$ has elapsed.

In the next step 56, the microcontroller 13 commands the excitation current control circuit 7 to feed the rotor winding 4 of the alternator with an excitation current; that is to say an excitation pulse of period $T_1$, such as those which can be seen in FIG. 2C, is started. After this, the system returns to the main program in a step 60.

Once the excitation period $T_1$ has elapsed, the timing circuit 12 produces a new interruption, and the test 51 is performed again. Since the flag D is at 1, it is then the NO output 53 of the test that is selected. The value 0 is loaded in a step 57 into the flag D, after which the value $T-T_1$ is loaded in a step 58, the value of $T_1$ being that which has been computed by the main programme. Finally, in a step 59, the excitation current control circuit 7 is commanded to cease supplying current to the alternator rotor winding 4 for the whole of the period $T-T_1$, and the system returns once again, in a step 60, to the main program.

When the period $T-T_1$ has elapsed, a fresh interruption will be produced, and since the flag D is now at 0, the steps 51, 52 and 54 to 56, described above, will then be repeated.

Figure 5:
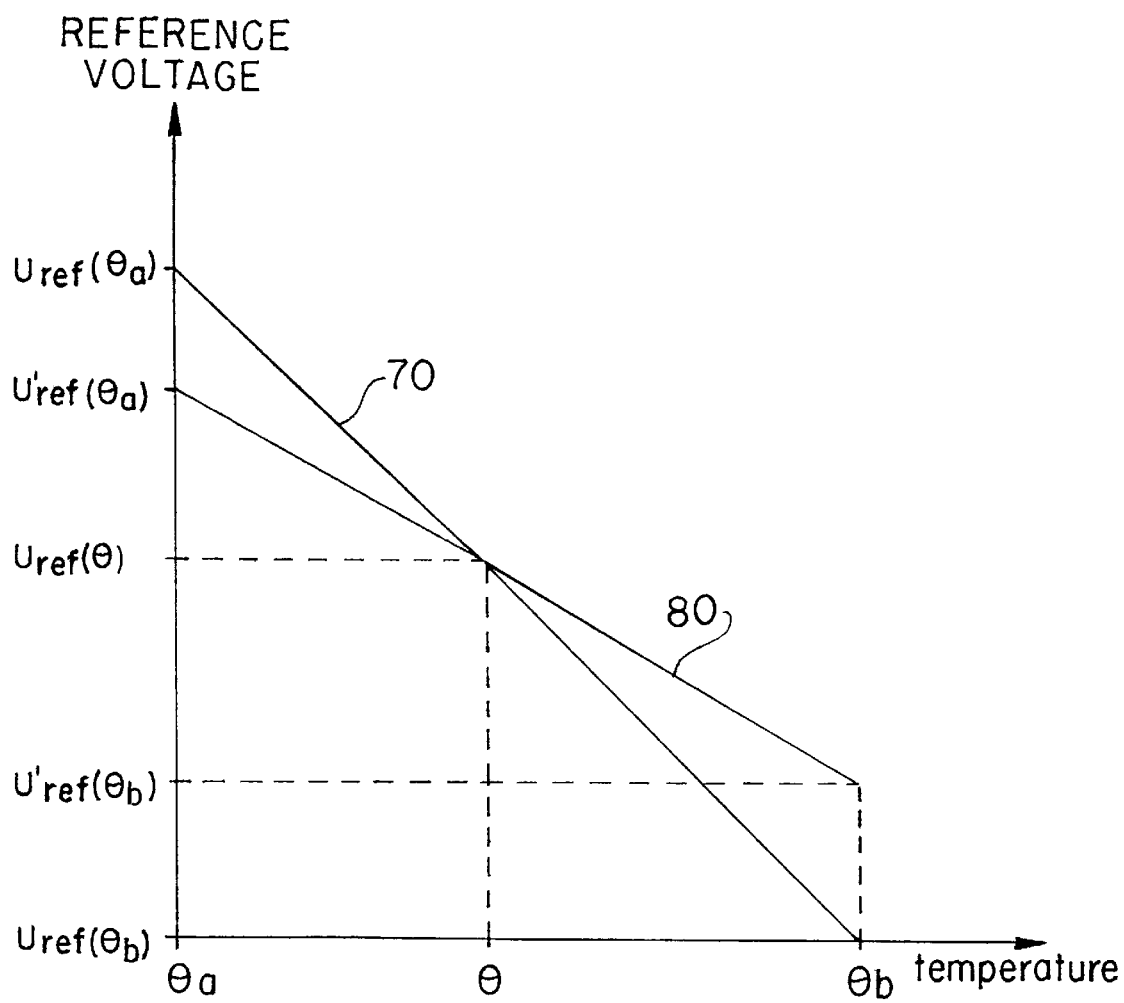
FIG. 5 is a graph in which calculated reference voltage is plotted against temperature.

Reference is now made to FIG. 5, which shows how the reference value $U_{ref}(\theta)$ is calculated, starting from a reference value $U_{ref}(\theta_a)$ which is predetermined for a given temperature $\theta_a$. Starting from this predetermined value, a correcting factor $f(\theta)$ is applied. This correcting factor depends on the temperature $\theta$ which has been measured, so that:

$$U_{ref}(\theta)=U_{ref}(\theta_a)-f(\theta).$$

In FIG. 5, the curves 70 and 80 show, respectively, two possible examples of the function $-f(\theta)$. If for example f is a linear function that increases with the temperature $\theta$, the graphic representation of $-f(\theta)$ is a straight line having a negative slope.

In this example, the curves 70 and 80 are calculated between $\theta_a=-30°$ C. and $\theta_b=140°$ C. In the curve 70, $U_{ref}(\theta_a)=15.05$ volts and $U_{ref}(\theta_b)=13.35$ volts. This enables a thermal compensation of $-10$ millivolts/° C. to be obtained, while in the curve 80, $U'_{ref}(\theta_a)=14.725$ volts, and $U'_{ref}(\theta_b)=14.13$ volts, which enables thermal compensation of $-3.5$ millivolts/° C. to be obtained.

Naturally, other forms of thermal compensation may be used instead. In particular, the function f does not necessarily have to be a linear function, but may take any form whatever. Similarly, the reference value of the voltage could be calculated as a function of other parameters of the alternator, such as its speed, or the load applied to it.

What is claimed is:

1. In a vehicle having an alternator and a battery connected to the alternator, a method of regulating the excitation current in a rotor winding of the alternator, the alternator comprising: a stator; a rotor including said rotor winding, the stator comprising stator windings; and a rectifier bridge connected to the said stator windings for delivering a rectified voltage to be regulated by the said method, the said rectified voltage having a waveform comprising a low frequency, variable amplitude, component produced by the said excitation current, whereby the said rectified voltage is a periodic voltage of period T, with each said period T consisting of a first phase and a second phase, the said first phase being a phase in which the voltage of the battery is applied to the stator winding, and the second phase being a phase in which application of the battery voltage to the stator winding is absent, wherein the said method includes the steps of:

starting a measurement of the rectified voltage during each said period T, carrying out the said measurement by sampling over a predetermined sampling period, that is to say by carrying out successive measurements close together, calculating a reference value of the rectified voltage, making a comparison between the measured value of the rectified voltage and the said calculated reference value, and deducing from the said comparison the duration of the said first phase of the next following period T, and wherein the said sampling ends, in each period T, at an instant T−ε, where ε is a time period which is very short by comparison with the length of the period T.

2. A method according to claim 1, wherein the said sampling period is substantially equal to one half of the period T.

3. A method according to claim 1, wherein the comparison of the measured value of the rectified voltage with the said calculated reference value is carried out during the time period ε, the period ε being defined from the end of the said sampling period and the end of the corresponding period T.

4. A method according to claim 1, wherein the calculation of the duration of the said first phase of the next following period T is carried out during the time period ε, which is defined from the end of the said sampling period and the end of the corresponding period T.

5. A method according to claim 3, wherein the time period ε is substantially equal to the minimum time necessary for carrying out the steps of:

comparing the measured value of the rectified voltage with the calculated reference value, and calculating the duration of the said first phase of the next following period T.

6. A method according to claim 1, wherein the said reference value is calculated as a function of at least one parameter associated with at least one of the alternator and the battery.

7. A method according to claim 6, wherein the said reference value is calculated as a function of the temperature of at least one of the alternator and the battery.

8. A method according to claim 6, wherein the calculation of the said reference value is carried out over a time period defined between the start of the period T and the start of the said sampling period in the same period T.

9. A method according to claim 6, consisting of the steps of:

measuring temperature in the course of each period T, and deducing therefrom the said reference value as a function of the temperature so measured, and then comparing the said reference value with the measured value of the rectified voltage.

10. A method according to claim 9, wherein the said reference value is calculated, from a value of voltage which is predetermined for a given temperature, by applying to the said predetermined voltage value a correcting factor which is a function of the temperature.

11. A regulating device for the excitation current in an alternator, adapted to perform the method of claim 1.

* * * * *